US012259675B2

(12) United States Patent
Fukamachi et al.

(10) Patent No.: US 12,259,675 B2
(45) Date of Patent: Mar. 25, 2025

(54) PROCESS CARTRIDGE INCLUDING DEVELOPING CARTRIDGE HAVING DEVELOPING HOLDER, AND DRUM CARTRIDGE HAVING ELASTIC MEMBER THAT CAN BE CONNECTED TO DEVELOPING HOLDER

(71) Applicant: BROTHER KOGYO KABUSHIKI KAISHA, Nagoya (JP)

(72) Inventors: Yasuo Fukamachi, Nagoya (JP); Shinya Kusuda, Nagoya (JP); Kazutoshi Nakamura, Kuwana (JP); Junya Sumida, Ama (JP); Hideshi Nishiyama, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/535,272

(22) Filed: Dec. 11, 2023

(65) Prior Publication Data

US 2024/0111239 A1 Apr. 4, 2024

Related U.S. Application Data

(63) Continuation of application No. PCT/JP2022/022087, filed on May 31, 2022.

(30) Foreign Application Priority Data

Jun. 24, 2021 (JP) ................................ 2021-104532

(51) Int. Cl.
*G03G 21/16* (2006.01)
*G03G 15/00* (2006.01)
*G03G 15/08* (2006.01)

(52) U.S. Cl.
CPC ....... *G03G 15/751* (2013.01); *G03G 15/0863* (2013.01); *G03G 15/0865* (2013.01);
(Continued)

(58) Field of Classification Search
CPC .......... G03G 15/0863; G03G 15/0865; G03G 15/751; G03G 21/1821
(Continued)

(56) References Cited

U.S. PATENT DOCUMENTS 9,104,165 B2 * 8/2015 Eguchi .................. G03G 15/70
9,958,825 B2 * 5/2018 Abe .................. G03G 21/1821
(Continued)

FOREIGN PATENT DOCUMENTS

JP 3196279 U 3/2015
JP 2018-116091 A 7/2018
(Continued)

OTHER PUBLICATIONS

International Search Report issued in corresponding application PCT/JP2022/022087, completed on Jul. 5, 2022 and mailed on Jul. 19, 2022.

(Continued)

*Primary Examiner* — Hoan H Tran
(74) *Attorney, Agent, or Firm* — Merchant & Gould P.C.

(57) ABSTRACT

A process cartridge includes: a drum cartridge; and a developing cartridge. The drum cartridge includes: a drum frame; a photosensitive drum rotatable about a first axis extending in a first direction; and a first memory having a first electrical contact surface. The developing cartridge is attachable to the drum frame and includes: a casing; a developing roller rotatable about a second axis extending in the first direction; a second memory having a second electrical contact surface; and a developing holder holding the second electrical contact surface such that the second electrical contact surface is movable relative to the casing. The drum cartridge further includes an elastic member that can expand and contract in a second direction crossing the first direction. The developing holder is connected to the elastic member and is movable in the second direction in a state where the developing cartridge is attached to the drum frame.

15 Claims, 7 Drawing Sheets

(52) U.S. Cl.
CPC ............. *G03G 2215/00713* (2013.01); *G03G 2215/025* (2013.01)

(58) Field of Classification Search
USPC .......................................... 399/107, 110, 111
See application file for complete search history.

(56) References Cited

U.S. PATENT DOCUMENTS

| | | | | |
|---|---|---|---|---|
| 10,649,389 | B1 | 5/2020 | Carpenter et al. | |
| 11,294,299 | B2 * | 4/2022 | Hamada ............. | G03G 15/0808 |
| 2015/0037059 | A1 | 2/2015 | Yang et al. | |
| 2018/0203408 | A1 | 7/2018 | Itabashi et al. | |
| 2018/0314202 | A1 | 11/2018 | Yokoi | |
| 2021/0063911 | A1 | 3/2021 | Kiriyama et al. | |
| 2021/0311411 | A1 | 10/2021 | Kusuda et al. | |

FOREIGN PATENT DOCUMENTS

| | | | |
|---|---|---|---|
| JP | 2018-189740 | A | 11/2018 |
| JP | 2021-39176 | A | 3/2021 |
| JP | 2021-162750 | A | 10/2021 |

OTHER PUBLICATIONS

International Preliminary Report on Patentability issued in corresponding application PCT/JP2022/022087, Dec. 14, 2023.

* cited by examiner

PROCESS CARTRIDGE INCLUDING DEVELOPING CARTRIDGE HAVING DEVELOPING HOLDER, AND DRUM CARTRIDGE HAVING ELASTIC MEMBER THAT CAN BE CONNECTED TO DEVELOPING HOLDER

REFERENCE TO RELATED APPLICATIONS

This is a by-pass continuation application of International Application No. PCT/JP2022/022087 filed May 31, 2022 which claims priority from Japanese Patent Application No. 2021-104532 filed Jun. 24, 2021. The entire contents of the International Application and the priority application are incorporated herein by reference.

BACKGROUND ART

Conventionally, an electro-photographic type image-forming apparatus such as a laser printer, an LED printer, or the like is known in the art. The conventional image-forming apparatus includes a developing cartridge, and a drum cartridge. The developing cartridge is attached to the drum cartridge. The drum cartridge to which the developing cartridge is attached is attached to the image-forming apparatus. Further, the developing cartridge in the conventional image-forming apparatus includes an IC chip. The IC chip stores therein various information related to the developing cartridge.

SUMMARY

Recently, installation of an IC chip is required not only on a developing cartridge but also on a drum cartridge. However, an electrical contact surface of the IC chip needs to be movable relative to a frame of the drum cartridge in order to prevent the electrical contact surface from wearing off at the time of attachment of the drum cartridge to which the developing cartridge is attached to an image-forming apparatus. In a case where an IC chip is installed on both the developing cartridge and the drum cartridge, a structure for enabling movement of the electrical contact surface needs to be provided on both the developing cartridge and the drum cartridge, which leads to increase in the number of components.

In view of the foregoing, it is an object of the present disclosure to provide a technique installing a memory on a developing cartridge and a drum cartridge, and capable of reducing the number of components in the developing cartridge.

In order to attain the above and other object, the present disclosure provides a process cartridge including: a drum cartridge; and a developing cartridge. The drum cartridge includes: a drum frame; a photosensitive drum; and a first memory. The photosensitive drum is rotatable about a first axis extending in a first direction. The first memory has a first electrical contact surface. The first memory stores therein information related to the drum cartridge. The developing cartridge is attachable to the drum frame. The developing cartridge includes: a casing; a developing roller; a second memory; and a developing holder. The developing roller is rotatable about a second axis extending in the first direction. The second memory has a second electrical contact surface. The second memory stores therein information related to the developing cartridge. The developing holder holds the second electrical contact surface such that the second electrical contact surface is movable relative to the casing. The drum cartridge further includes: an elastic member that can expand and contract in a second direction crossing the first direction. The developing holder is connected to the elastic member and is movable in the second direction in a state where the developing cartridge is attached to the drum frame.

In the above structure, the drum cartridge includes the elastic member that can be connected to the developing holder. As the elastic member expands and contracts, the developing holder moves in the second direction relative to the drum frame, whereby wear of the second electrical contact surface is restrained. Further, since an elastic member need not be provided in the developing holder, the number of components in the developing cartridge can be reduced.

DESCRIPTION

Figure 1:
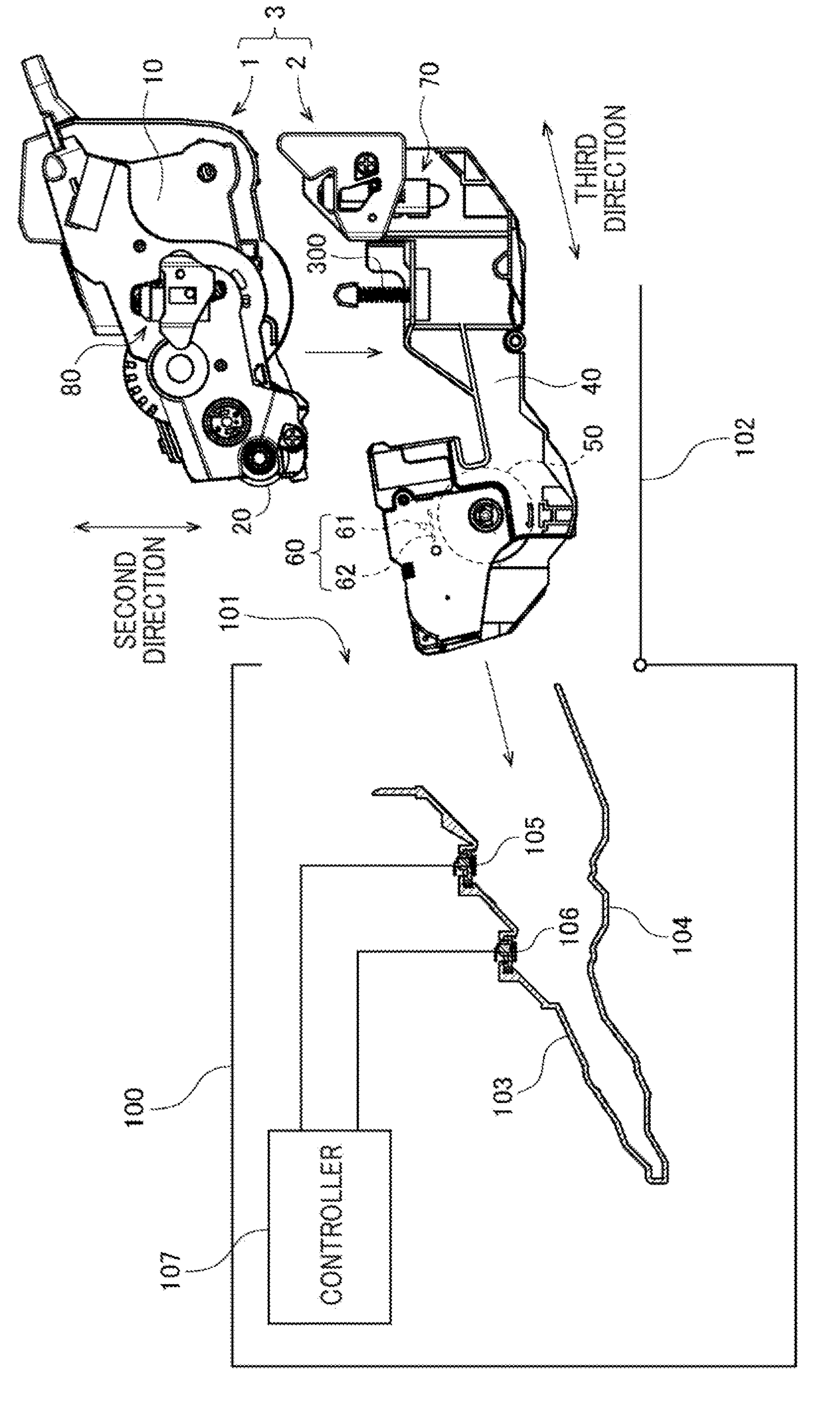
FIG. 1 is a view illustrating a process cartridge and an image-forming apparatus.

Hereinafter, one embodiment of the present disclosure will be described while referring to the drawings.

Incidentally, in the following description, a direction in which a photosensitive drum extends will be referred to "first direction". Further, a direction crossing a first electrical contact surface will be referred to as "second direction". Further, a direction in which one end of a drum frame at which the photosensitive drum is positioned and another end of the drum frame are arranged will be referred to as "third direction". The first direction and the second direction cross each other (preferably, are perpendicular to each other). The first direction and the third direction cross each other (preferably, are perpendicular to each other). The second direction and the third direction cross each other.

<1. Overview of Image-Forming Apparatus>

FIG. 1 is a view illustrating a process cartridge 3 and an image-forming apparatus 100.

The image-forming apparatus 100 is an electro-photographic type printer. The image-forming apparatus 100 is, for example, a laser printer or an LED printer. The process cartridge 3 is attachable to and detachable from the image-forming apparatus 100. As illustrated in FIG. 1, the process cartridge 3 includes a developing cartridge 1, and a drum cartridge 2. The developing cartridge 1 is attachable to and detachable from the drum cartridge 2. The image-forming apparatus 100 forms images on printing sheets using toner supplied from the developing cartridge 1.

<2. Drum Cartridge>

Figure 2:
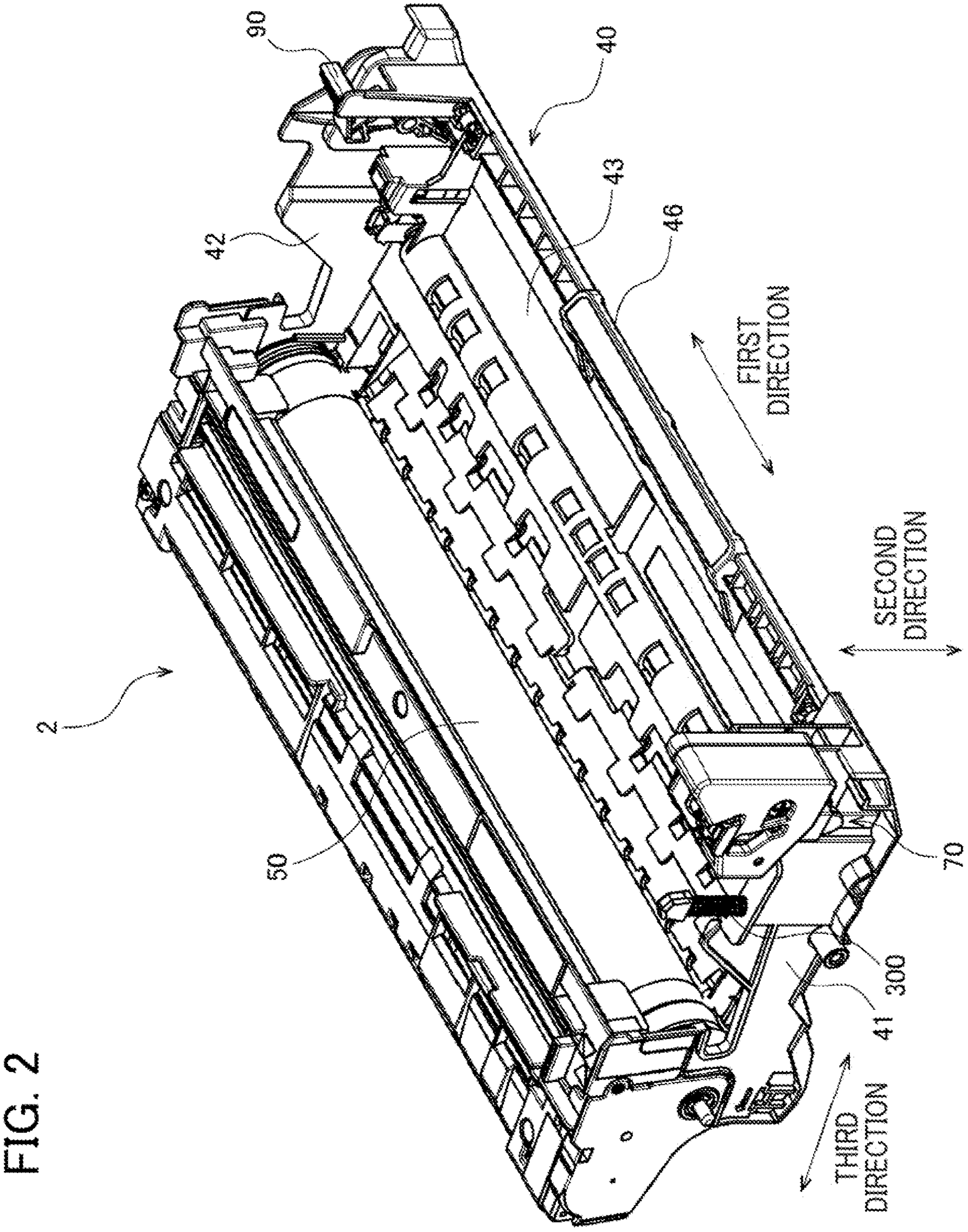
FIG. 2 is a perspective view of a drum cartridge.

FIG. 2 is a perspective view of the drum cartridge 2. As illustrated in FIGS. 1 and 2, the drum cartridge 2 includes a drum frame 40, a photosensitive drum 50, a scorotron-type charger 60, a first memory assembly 70, and a lock lever 90.

The drum frame 40 is a frame that supports the photosensitive drum 50. The drum frame 40 includes a first side frame 41, a second side frame 42, and a connection frame 43. The first side frame 41 is positioned at one end portion of the drum frame 40 in the first direction. The second side frame 42 is positioned at another end portion of the drum frame 40 in the first direction. The first side frame 41 and the second side frame 42 are positioned away from each other in the first direction.

The first side frame 41 extends in a direction crossing the first direction. That is, the first side frame 41 extends in the second direction and the third direction. The second side frame 42 extends in a direction crossing the first direction. That is, the second side frame 42 extends in the second direction and the third direction. The connection frame 43 connects the first side frame 41 and the second side frame 42 to each other in the first direction.

The developing cartridge 1 is attachable to and detachable from the drum frame 40. In a state where the developing cartridge 1 is attached to the drum frame 40, the developing cartridge 1 is positioned between the first side frame 41 and the second side frame 42 in the first direction.

The photosensitive drum 50 is a drum that is rotatable about a rotation axis (a first axis) extending in the first direction. The photosensitive drum 50 is positioned between the first side frame 41 and the second side frame 42 in the first direction. Further, the photosensitive drum 50 is positioned at one end portion of the drum frame 40 in the third direction. The photosensitive drum 50 has a hollow cylindrical outer circumferential surface. The outer circumferential surface of the photosensitive drum 50 is coated with a photosensitive material. In a state where the process cartridge 3 is attached to the image-forming apparatus 100, the photosensitive drum 50 rotates due to a driving force supplied from the image-forming apparatus 100.

Note that the drum cartridge 2 includes a handle 46 positioned at another end of the drum frame 40 in the third direction.

The scorotron-type charger 60 is a device configured to charge the outer circumferential surface of the photosensitive drum 50. As illustrated in FIG. 1, the scorotron-type charger 60 faces the photosensitive drum 50 in the second direction. Specifically, the scorotron-type charger 60 includes a charge wire 61, and a charge grid 62. The charge wire 61 faces the outer circumferential surface of the photosensitive drum 50 in the second direction. The charge wire 61 extends in the first direction along the outer circumferential surface of the photosensitive drum 50. The charge grid 62 is positioned between the photosensitive drum 50 and the charge wire 61 in the second direction.

The image-forming apparatus 100 supplies a voltage between the charge wire 61 and the charge grid 62 in a state where the process cartridge 3 is attached to the image-forming apparatus 100. As a result, the outer circumferential surface of the photosensitive drum 50 is charged.

Figure 3:
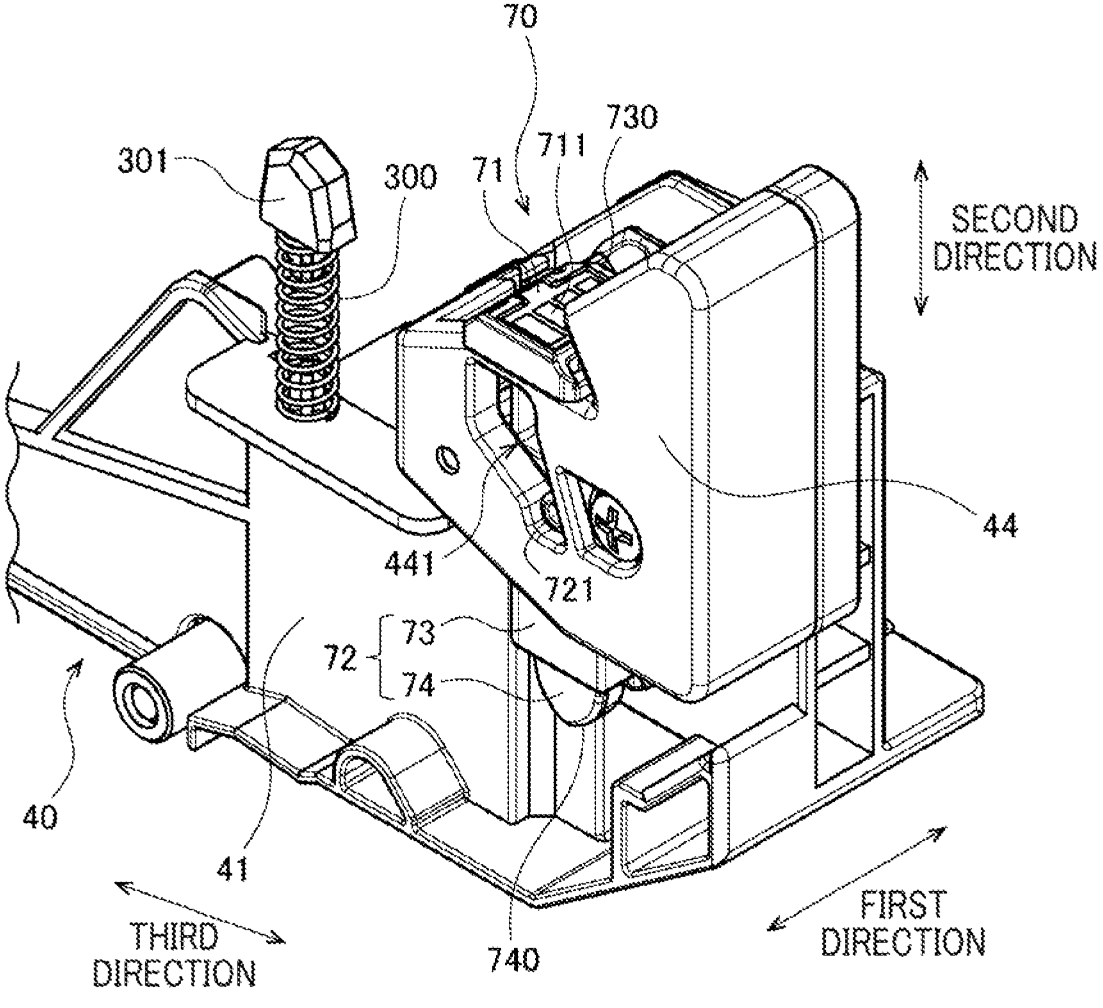
FIG. 3 is a partial perspective view of the drum cartridge.
Figure 4:
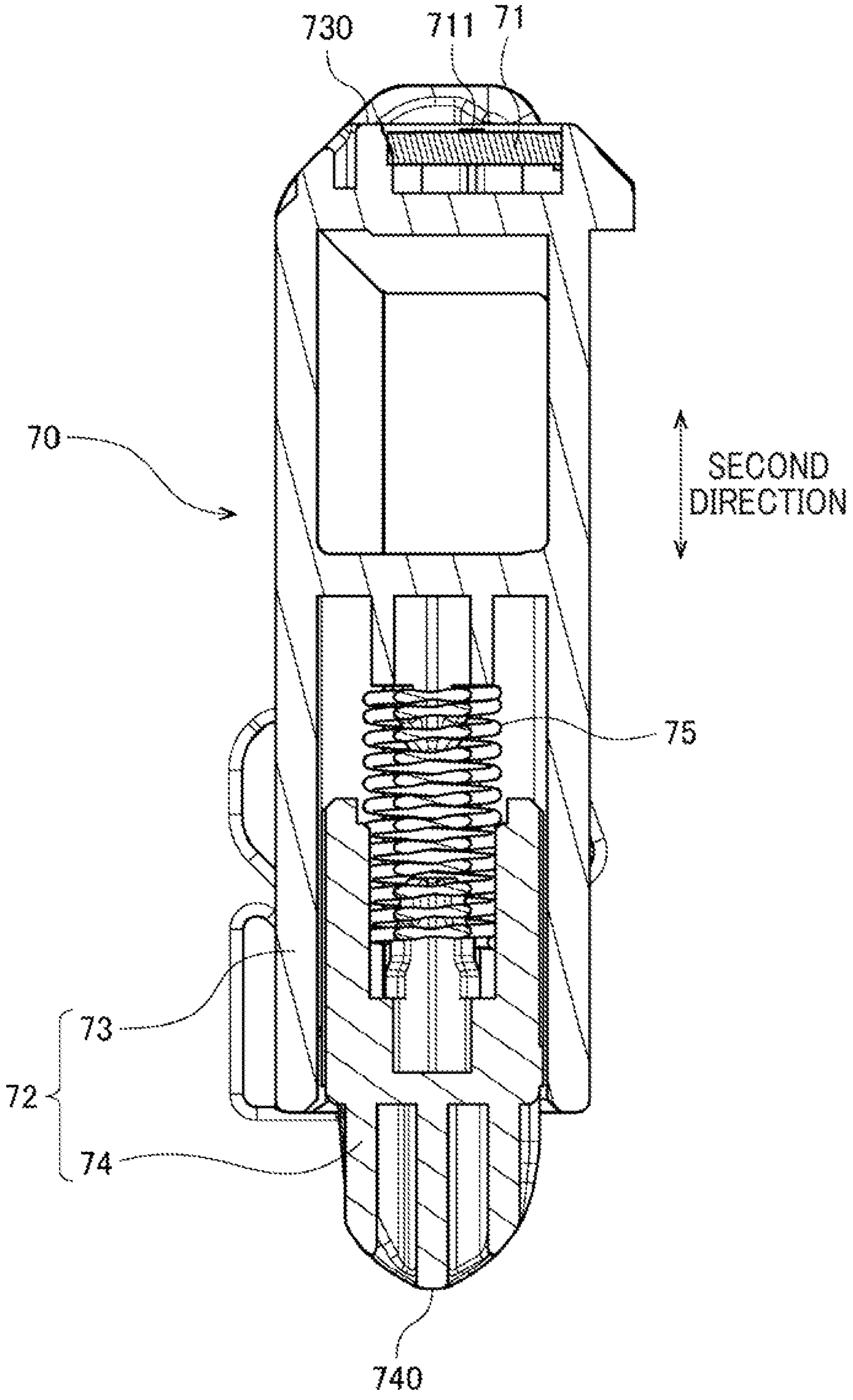
FIG. 4 is a cross-sectional view of a first memory assembly.

FIG. 3 is a partial perspective view of the drum cartridge 2 in the vicinity of the first memory assembly 70. FIG. 4 is a cross-sectional view of the first memory assembly 70. FIG. 4 illustrates a cross-section that is perpendicular to the first direction. The first memory assembly 70 is positioned at the one end portion of the drum frame 40 in the first direction. Further, the first memory assembly 70 is positioned at an outer surface of the drum frame 40. Specifically, the first memory assembly 70 is positioned at an outer surface of the first side frame 41. In a state where the developing cartridge 1 is attached to the drum frame 40, the first memory assembly 70 is positioned on the opposite side of the first side frame 41 from the developing cartridge 1.

The first memory assembly 70 includes a first memory 71 which is a storage medium, and a drum holder 72 holding the first memory 71. The first memory 71 is, for example, an IC chip. The first memory 71 is positioned at an outer surface of the drum holder 72. The first memory 71 stores therein information related to the drum cartridge 2. Specifically, the first memory 71 stores therein at least one of identification information and lifetime information on the drum cartridge 2. The identification information is information for identifying the drum cartridge 2. The identification information is, for example, a manufacturing number of the drum cartridge 2. The lifetime information is information indicative of a service life of the drum cartridge 2. The lifetime information is, for example, the cumulative number of revolutions of the photosensitive drum 50.

The first memory 71 has a first electrical contact surface 711. The first electrical contact surface 711 is a surface of metal which is an electric conductor. The first electrical contact surface 711 is attached to the outer surface of the first side frame 41 through the drum holder 72. Hence, the first electrical contact surface 711 is positioned at the outer surface of the first side frame 41.

As illustrated in FIGS. 2 and 3, the drum frame 40 includes a drum holder cover 44. The drum holder cover 44 is positioned at the outer surface of the first side frame 41. Specifically, the drum holder cover 44 is fixed to the outer surface of the first side frame 41 with a screw. Note that the drum holder cover 44 may be fixed to the outer surface of the first side frame 41 with a bolt. The drum holder 72 is positioned between the first side frame 41 and the drum holder cover 44 in the first direction.

The drum holder 72 includes a first boss 721, and a second boss (not illustrated). The first boss 721 extends in the first direction toward the drum holder cover 44 from a surface of the drum holder 72 that faces the drum holder cover 44. A shape of the first boss 721 may be a circular columnar shape, or may be a prismatic columnar shape or the like. In the meantime, the drum holder cover 44 has a first hole 441. The first hole 441 is a through-hole that penetrates the drum holder cover 44 in the first direction. The first boss 721 is inserted in the first hole 441. However, the drum holder cover 44 may have a recessed portion instead of the first hole 441 to allow the first boss 721 to be inserted therein.

The second boss extends in the first direction toward the first side frame 41 from a surface of the drum holder 72 that faces the first side frame 41. A shape of the second boss may be a circular columnar shape, or may be a prismatic columnar shape or the like. In the meantime, the first side frame 41 has a second hole (not illustrated). The second hole is a through-hole that penetrates the first side frame 41 in the first direction. The second boss is inserted in the second hole. However, the first side frame 41 may have a recessed portion instead of the second hole to allow the second boss to be inserted therein.

The first hole 441 has a size (an inner dimension) in the second direction that is greater than a size (an outer dimension) of the first boss 721 in the second direction. Hence, the first boss 721 is movable in the second direction within the first hole 441. Further, the second hole has a size (an inner dimension) in the second direction that is greater than a size (an outer dimension) of the second boss in the second direction. Hence, the second boss is movable in the second direction within the second hole. Accordingly, the drum holder 72 is movable together with the first boss 721 and the second boss in the second direction relative to the drum frame 40 and the drum holder cover 44. When the drum holder 72 moves in the second direction relative to the drum frame 40, the first electrical contact surface 711 of the first memory 71 also moves in the second direction relative to the drum frame 40.

The drum holder 72 has a first outer surface 730, and a second outer surface 740. The first outer surface 730 is positioned at one end of the drum holder 72 in the second direction. The second outer surface 740 is positioned at another end of the drum holder 72 in the second direction. The second outer surface 740 is movable in the second direction relative to the first outer surface 730.

Specifically, the drum holder 72 according to the present embodiment includes a first holder member 73, a second holder member 74, and a first coil spring 75 interposed therebetween. The first holder member 73 is made of, for example, resin. The second holder member 74 is made of, for example, resin. The first holder member 73 has the first outer surface 730. The first memory 71 is fixed to the first outer surface 730. Hence, the first electrical contact surface 711 is positioned at the one end of the drum holder 72 in the second direction. The second holder member 74 has the second outer surface 740. The first outer surface 730 and the second outer surface 740 are positioned away from each other in the second direction.

The first coil spring 75 is an elastic member that extends in the second direction. The first coil spring 75 is positioned between the first outer surface 730 and the second outer surface 740 in the second direction. One end of the first coil spring 75 in the second direction is connected to the first holder member 73. Another end of the first coil spring 75 in the second direction is connected to the second holder member 74.

The first coil spring 75 expands and contracts in the second direction at least between a first state and a second state that is more contracted than the first state. The first coil spring 75 in the first state has a length in the second direction that is greater a length in the second direction of the first coil spring 75 in the second state. Hence, a distance in the second direction between the first outer surface 730 and the second outer surface 740 in the first state is greater than a distance in the second direction between the first outer surface 730 and the second outer surface 740 in the second state. Further, the length in the second direction of the first coil spring 75 at least in the second state is shorter than a natural length of the first coil spring 75. The first coil spring 75 is an example of the first elastic member.

The lock lever 90 is positioned at the other end portion of the drum frame 40 in the first direction. Specifically, the lock lever 90 is positioned at the second side frame 42. The lock lever 90 is pivotally movable about a pivot axis extending in the first direction relative to the drum frame 40 between a lock position and a release position. The lock lever 90 is positioned at the lock position when the developing cartridge 1 is attached to the drum frame 40. Hence, the developing cartridge 1 is locked relative to the drum frame 40. Further, when the lock lever 90 pivotally moves from the lock position to the release position in a state where the developing cartridge 1 is attached to the drum frame 40, lock of the developing cartridge 1 relative to the drum frame 40 is released.

<3. Developing Cartridge>

Figure 5:
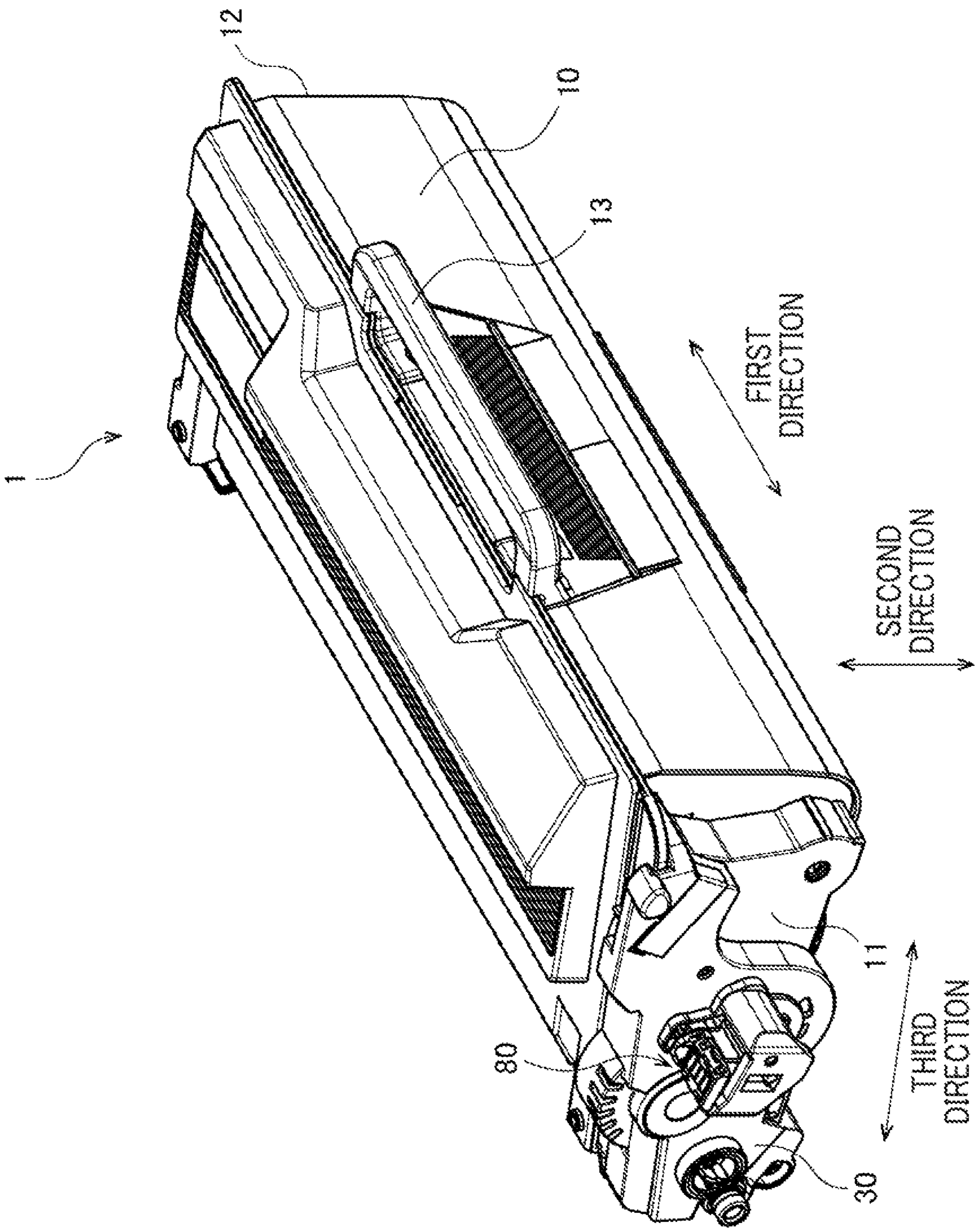
FIG. 5 is a perspective view of a developing cartridge.

FIG. 5 is a perspective view of the developing cartridge 1. As illustrated in FIGS. 1 and 5, the developing cartridge 1 includes a casing 10, a developing roller 20, a gear portion 30, and a second memory assembly 80.

The casing 10 has a first outer surface 11, and a second outer surface 12. The first outer surface 11 is positioned at one end of the casing 10 in the first direction. The second outer surface 12 is positioned at another end of the casing 10 in the first direction. The first outer surface 11 and the second outer surface 12 are positioned away from each other in the first direction.

In a state where the developing cartridge 1 is attached to the drum frame 40, the first outer surface 11 of the developing cartridge 1 and the first side frame 41 of the drum cartridge 2 face each other in the first direction. Further, in a state where the developing cartridge 1 is attached to the drum frame 40, the second outer surface 12 of the developing cartridge 1 and the second side frame 42 of the drum cartridge 2 face each other in the first direction.

Developing agent is accommodated inside the casing 10. The developing agent is, for example, toner. The developing roller 20 is roller that is rotatable about a rotation axis (a second axis) extending in the first direction. The developing roller 20 is positioned at one end of the casing 10 in the third direction. The developing roller 20 and the photosensitive drum 50 face each other in the third direction in a state where the developing cartridge 1 is attached to the drum frame 40. Specifically, an outer circumferential surface of the developing roller 20 and the outer circumferential surface of the photosensitive drum 50 make contact with each other in a state where the developing cartridge 1 is attached to the drum frame 40.

The developing agent in the casing 10 is supplied to the outer circumferential surface of the developing roller 20 through a supply roller (not illustrated). Hence, the developing agent is carried on the outer circumferential surface of the developing roller 20. Then, the developing agent on the outer circumferential surface of the developing roller 20 is supplied to the photosensitive drum 50 of the drum cartridge 2. At this time, the developing agent moves from the developing roller 20 to the photosensitive drum 50 corresponding to an electrostatic latent image formed on the outer circumferential surface of the photosensitive drum 50. Hence, an image with the developing agent is formed on the outer circumferential surface of the photosensitive drum 50.

Note that the developing cartridge 1 includes a handle 13 at another end of the casing 10 in the third direction.

The gear portion 30 is positioned at the first outer surface 11 of the casing 10. The gear portion 30 includes a plurality of gears. In a state where the process cartridge 3 is attached to the image-forming apparatus 100, the image-forming apparatus 100 supplies a driving force to the developing roller 20 through the plurality of gears of the gear portion 30, whereby the developing roller 20 rotates.

Figure 6:
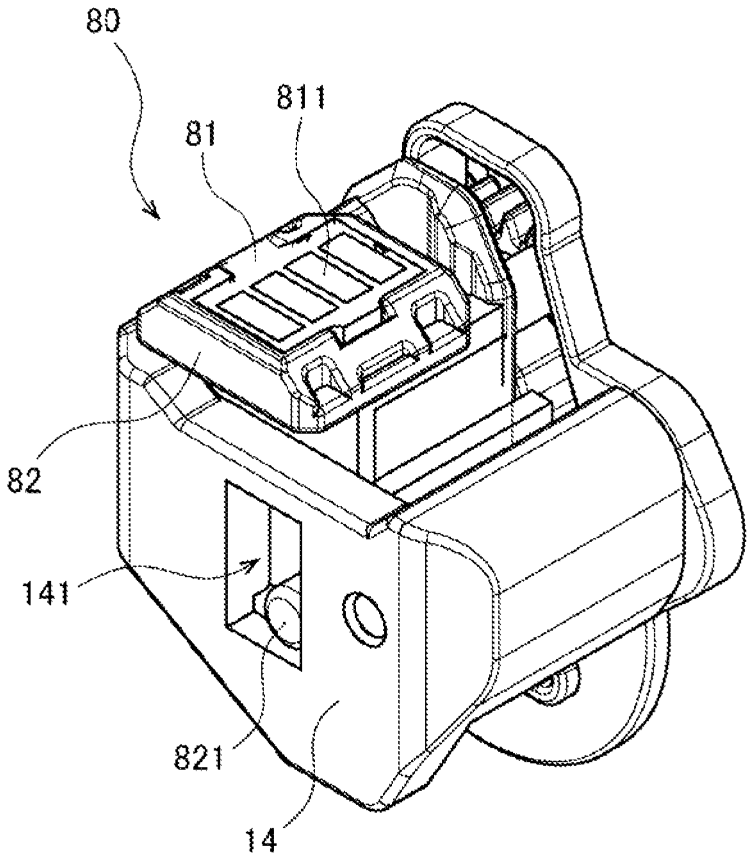
FIG. 6 is a partial perspective view of the developing cartridge.

FIG. 6 is a partial perspective view of the developing cartridge 1 in the vicinity of the second memory assembly 80. The second memory assembly 80 is positioned at one end portion of the casing 10 in the first direction. Specifically, the second memory assembly 80 is positioned at the first outer surface 11 of the casing 10. As illustrated in FIG. 6, the second memory assembly 80 includes a second memory 81 which is a storage medium, and a developing holder 82 holding the second memory 81. The second memory 81 is, for example, an IC chip. The second memory 81 is positioned at an outer surface of the developing holder 82.

The second memory 81 stores therein information related to the developing cartridge 1. Specifically, the second memory 81 stores therein at least one of identification information and lifetime information on the developing cartridge 1. The identification information is information for identifying the developing cartridge 1. The identification information is, for example, a manufacturing number of the developing cartridge 1. The lifetime information is information indicative of a service life of the developing cartridge 1.

The lifetime information is, for example, the cumulative number of revolutions of the developing roller 20.

The second memory 81 has a second electrical contact surface 811. The second electrical contact surface 811 is a surface of metal which is an electric conductor.

As illustrated in FIG. 6, the casing 10 includes a developing holder cover 14. The developing holder cover 14 is positioned at the first outer surface 11 of the casing 10. Specifically, the developing holder cover 14 is fixed to the first outer surface 11 of the casing 10 with a screw. Incidentally, developing holder cover 14 may be fixed to the first outer surface 11 of the casing 10 with a bolt. The developing holder 82 is positioned between the first outer surface 11 and the developing holder cover 14 in the first direction.

The developing holder 82 includes a third boss 821, and a fourth boss (not illustrated). The third boss 821 extends in the first direction toward the developing holder cover 14 from a surface of the developing holder 82 that faces the developing holder cover 14. A shape of the third boss 821 may be a circular columnar shape, or may be a prismatic columnar shape or the like. In the meantime, the developing holder cover 14 has a third hole 141. The third hole 141 is a through-hole that penetrates the developing holder cover 14 in the first direction. The third boss 821 is inserted in the third hole 141.

The fourth boss extends in the first direction toward the first outer surface 11 from a surface of the developing holder 82 that faces the first outer surface 11. A shape of the fourth boss may be a circular columnar shape, or may be another shape such as a prismatic columnar shape. In the meantime, the first outer surface 11 has a fourth hole (not illustrated). The fourth hole is a recessed portion formed in the first outer surface 11. The fourth boss is inserted in the fourth hole.

The third hole 141 has a size (an inner dimension) in the second direction greater than a size (an outer dimension) of the third boss 821 in the second direction. Hence, the third boss 821 is movable in the second direction within the third hole 141. Further, the fourth hole has a size (an inner dimension) in the second direction greater than a size (an outer dimension) of the fourth boss in the second direction. Hence, the fourth boss is movable in the second direction within the fourth hole. Accordingly, the developing holder 82 is movable in the second direction together with the third boss 821 and the fourth boss relative to the casing 10 and the developing holder cover 14. When the developing holder 82 moves in the second direction relative to the casing 10, the second electrical contact surface 811 of the second memory 81 also moves in the second direction relative to the casing 10.

The developing holder 82 is configured of a single component. The developing holder 82 is made of, for example, resin. A distance between one end of the developing holder 82 in the second direction and another end of the developing holder 82 in the second direction is constant. The second memory 81 is fixed to the one end of the developing holder 82 in the second direction. Hence, the second electrical contact surface 811 is positioned at the one end of the developing holder 82 in the second direction.

In a state where the developing cartridge 1 is attached to the drum frame 40, the second memory assembly 80 is exposed to an outside from the drum frame 40. Further, in a state where the developing cartridge 1 is attached to the drum frame 40, the first memory assembly 70 and the second memory assembly 80 are positioned at one end of the process cartridge 3 in the first direction. The first memory assembly 70 and the second memory assembly 80 are arranged in the third direction. The first memory assembly 70 and the second memory assembly 80 are positioned away from each other in the third direction. The second memory assembly 80 is positioned closer to the photosensitive drum 50 than the first memory assembly 70 is to the photosensitive drum 50 in the third direction.

<4. Elastic Member>

The drum cartridge 2 further includes an elastic member 300. As illustrated in FIGS. 2 and 3, the elastic member 300 is positioned at the one end portion of the drum frame 40 in the first direction. The elastic member 300 can expand and contract in the second direction between a first length and a second length that is shorter than the first length. The elastic member 300 is, for example, a coil spring. However, the elastic member 300 may be another kind of an urging member such as a leaf spring, a torsion spring, or the like. Alternatively, the elastic member 300 may be rubber or sponge.

The elastic member 300 has one end in the second direction and another end in the second direction. The other end of the elastic member 300 in the second direction is connected to the drum frame 40. Specifically, the other end of the elastic member 300 in the second direction is connected to the first side frame 41.

Figure 7:
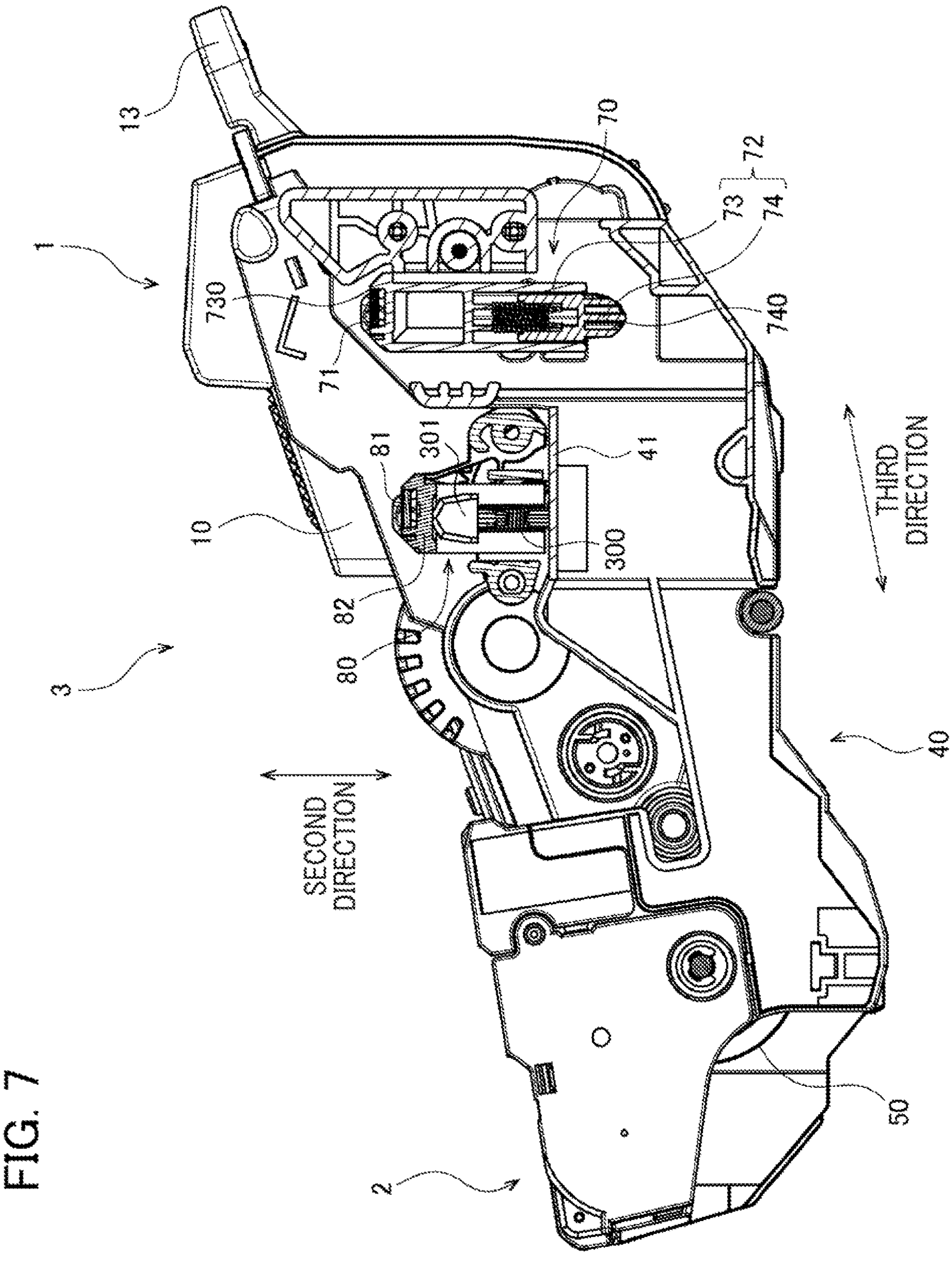
FIG. 7 is a cross-sectional view of the process cartridge.

FIG. 7 is a cross-sectional view of the process cartridge 3. FIG. 7 shows a cross-section perpendicular to the first direction and passing through the drum holder 72 and the developing holder 82. As illustrated in FIG. 7, in a state where the developing cartridge 1 is attached to the drum frame 40, the one end of the elastic member 300 in the second direction is connected to the developing holder 82. Specifically, the elastic member 300 includes a pressure member 301 at the one end in the second direction thereof. In a state where the developing cartridge 1 is attached to the drum frame 40, the pressure member 301 is in contact with the developing holder 82.

In a state where the developing cartridge 1 is attached to the drum frame 40 and the one end of the elastic member 300 in the second direction is connected to the developing holder 82, the developing holder 82 is movable in the second direction between a first position and a second position relative to the drum frame 40. When the developing holder 82 is at the first position, the length of the elastic member 300 in the second direction is the first length. When the developing holder 82 is at the second position, the length of the elastic member 300 in the second direction is the second length.

<5. Attachment Operation of Process Cartridge>

The image-forming apparatus 100 has an opening 101 allowing the process cartridge 3 to be attached therethrough, and includes a main cover 102. The main cover 102 pivotally moves between a closed position in which the main cover 102 covers the opening 101 of the image-forming apparatus 100 and an open position in which the main cover 102 opens the opening 101 of the image-forming apparatus 100. When the process cartridge 3 is attached to the image-forming apparatus 100, the main cover 102 is positioned at the open position, and the process cartridge 3 passes through the opening 101 and is attached to an inside of the image-forming apparatus 100. At this time, the process cartridge 3 moves in the third direction.

As illustrated in FIG. 1, the image-forming apparatus 100 includes a first guide frame 103, a second guide frame 104, a first electrical connector 105, and a second electrical connector 106. Each of the first guide frame 103 and the second guide frame 104 extends in the third direction. The first guide frame 103 and the second guide frame 104 face each other in the second direction. Further, a gap in the second direction between the first guide frame 103 and the second guide frame 104 decreases as extending away from the opening 101 in the third direction.

The first electrical connector 105 and the second electrical connector 106 are positioned at the first guide frame 103. The first electrical connector 105 and the second electrical connector 106 are arranged to be spaced apart from each other in the third direction. The first electrical connector 105 is a terminal that can make contact with the first electrical contact surface 711 of the first memory 71. The second electrical connector 106 is a terminal that can make contact with the second electrical contact surface 811 of the second memory 81. The first electrical connector 105 and the second electrical connector 106 are electrically connected to a controller 107 of the image-forming apparatus 100.

When the process cartridge 3 is attached to the image-forming apparatus 100, the first outer surface 730 of the drum holder 72 makes contact with the first guide frame 103, and the second outer surface 740 of the drum holder 72 makes contact with the second guide frame 104. The drum holder 72 moves in the second direction relative to the drum frame 40 as the drum holder 72 is guided by the first guide frame 103 and the second guide frame 104 while moving in the third direction. Further, since the gap in the second direction between the first guide frame 103 and the second guide frame 104 is gradually reduced, the distance in the second direction between the first outer surface 730 and the second outer surface 740 also becomes gradually reduced.

When attachment of the process cartridge 3 to the image-forming apparatus 100 is completed, the first electrical contact surface 711 of the first memory 71 makes contact with the first electrical connector 105. As such, the controller 107 of the image-forming apparatus 100 can read information from the first memory 71 and write information into the first memory 71.

Further, when the process cartridge 3 is attached to the image-forming apparatus 100, the one end portion of the developing holder 82 in the second direction makes contact with the first guide frame 103. The developing holder 82 moves in the second direction relative to the drum frame 40 as the developing holder 82 is guided by the first guide frame 103 while moving in the third direction. At this time, since the gap in the second direction between the first guide frame 103 and the second guide frame 104 is gradually reduced, the developing holder 82 moves in the second direction relative to the drum frame 40 from the first position toward the second position. Further, at this time, the elastic member 300 is contracted in the second direction from the first length toward the second length.

When the attachment of the process cartridge 3 to the image-forming apparatus 100 is completed, the second electrical contact surface 811 of the second memory 81 makes contact with the second electrical connector 106. Hence, the controller 107 of the image-forming apparatus 100 can read information from the second memory 81 and write information into the second memory 81.

As described above, the process cartridge 3 according to the present embodiment includes the elastic member 300 that supports the developing holder 82 such that the developing holder 82 is movable in the second direction relative to the drum frame 40. Therefore, the developing holder 82 is enabled to move in the second direction relative to the drum frame 40 when the process cartridge 3 is attached to the image-forming apparatus 100. Accordingly, wear of the second electrical contact surface 811 can be restrained.

With the above-described structure, the developing holder 82 does not require a component that directly receives a pressing force from the second guide frame 104. Specifically, a component like the second holder member 74 of the drum holder 72 need not be provided in the developing holder 82. Further, the elastic member 300 is not provided in the developing cartridge 1 but is provided in the drum cartridge 2. Hence, the developing holder 82 does not include the elastic member 300. Accordingly, the number of components in the developing holder 82 can be reduced, thereby reducing the number of components in the developing cartridge 1.

<6. Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the drum holder 72 holds the first memory 71. However, the drum holder 72 may hold only the first electrical contact surface 711 among the first memory 71. In this case, a portion of the first memory 71 other than the first electrical contact surface 711 may be held by another portion of the drum cartridge 2.

Further, in the embodiment described above, the developing holder 82 holds the second memory 81. However, the developing holder 82 may hold only the second electrical contact surface 811 among the second memory 81. In this case, a portion of the second memory 81 other than the second electrical contact surface 811 may be held by another portion of the developing cartridge 1.

Further, in the embodiment described above, the single process cartridge 3 is attached to the single image-forming apparatus 100. However, a plurality of process cartridges 3 may be attached to the single image-forming apparatus 100.

Further, a detailed shape of the process cartridge may be different from a shape illustrated in each drawing of the present application. Further, each component appearing in the embodiment and the modifications described above may be suitably combined as long as any contradiction is avoided.

What is claimed is:

1. A process cartridge comprising:

a drum cartridge including:

a drum frame;

a photosensitive drum rotatable about a first axis extending in a first direction; and a first memory having a first electrical contact surface, the first memory storing therein information related to the drum cartridge; and a developing cartridge attachable to the drum frame, the developing cartridge including:

a casing;

a developing roller rotatable about a second axis extending in the first direction;

a second memory having a second electrical contact surface, the second memory storing therein information related to the developing cartridge; and a developing holder holding the second electrical contact surface such that the second electrical contact surface is movable relative to the casing, wherein the drum cartridge further includes:

an elastic member that can expand and contract in a second direction crossing the first direction, and wherein the developing holder is connected to the elastic member and is movable in the second direction in a state where the developing cartridge is attached to the drum frame.

2. The process cartridge according to claim 1, wherein, in a state where the developing cartridge is attached to the drum frame, one end of the elastic member in the second direction is connected to the developing holder, and another end of the elastic member in the second direction is connected to the drum frame.

3. The process cartridge according to claim 1, wherein the drum cartridge further includes:

a scorotron-type charger configured to charge the photosensitive drum, the scorotron-type charger facing the photosensitive drum in the second direction.

4. The process cartridge according to claim 1, wherein the elastic member is a spring.

5. The process cartridge according to claim 1, wherein the drum cartridge further includes:

a drum holder holding the first electrical contact surface such that the first electrical contact surface is movable in the second direction relative to the drum frame.

6. The process cartridge according to claim 5, wherein the drum holder includes:

a first holder member holding the first electrical contact surface;

a second holder member movable in the second direction relative to the first holder member; and a first elastic member that can expand and contract in the second direction, wherein one end of the first elastic member in the second direction is connected to the first holder member, and wherein another end of the first elastic member in the second direction is connected to the second holder member.

7. The process cartridge according to claim 6, wherein the first elastic member is a spring.

8. The process cartridge according to claim 5, wherein the drum holder holds the first memory.

9. The process cartridge according to claim 1, wherein the first electrical contact surface is positioned at one end portion of the drum frame in the first direction, wherein the second electrical contact surface and the developing holder are positioned at one end portion of the casing in the first direction, and wherein the elastic member is positioned at the one end portion of the drum frame in the first direction.

10. The process cartridge according to claim 1, wherein the process cartridge is attachable to and detachable from an image-forming apparatus, and wherein the developing holder moves in the second direction relative to the drum frame at the time of attachment of the process cartridge to the image-forming apparatus.

11. The process cartridge according to claim 1, wherein the developing holder holds the second memory.

12. The process cartridge according to claim 1, wherein the drum cartridge further includes:

a lock lever pivotally movable about a pivot axis extending in the first direction between a lock position in which the lock lever locks the developing cartridge relative to the drum frame and a release position in which the lock lever releases lock of the developing cartridge relative to the drum frame, and wherein the lock lever is positioned at another end portion of the drum frame in the first direction.

13. The process cartridge according to claim 1, wherein the photosensitive drum is positioned at one end portion of the drum frame in a third direction crossing the first direction, and wherein the first electrical contact surface and the second electrical contact surface are arranged in the third direction in a state where the developing cartridge is attached to the drum frame.

14. The process cartridge according to claim 13, wherein the second electrical contact surface is positioned closer to the photosensitive drum than the first electrical contact surface is to the photosensitive drum in the third direction in a state where the developing cartridge is attached to the drum frame.

15. The process cartridge according to claim 13, wherein the photosensitive drum faces the developing roller in the third direction in a state where the developing cartridge is attached to the drum frame.

* * * * *